US009662639B2

United States Patent
Fan et al.

(10) Patent No.: US 9,662,639 B2
(45) Date of Patent: May 30, 2017

(54) CATALYTIC EFFECTS OF OXYGEN CARRIER BASED CHEMICAL-LOOPING REFORMING OF $CH_4$ WITH $CO_2$

(71) Applicant: University of Wyoming, Laramie, WY (US)

(72) Inventors: Maohong Fan, Ames, IA (US); Mingchen Tang, Laramie, WY (US)

(*) Notice: Subject to any disclaimer, the term of this patent is extended or adjusted under 35 U.S.C. 154(b) by 0 days.

(21) Appl. No.: 15/152,245

(22) Filed: May 11, 2016

(65) Prior Publication Data

US 2016/0332150 A1 Nov. 17, 2016

Related U.S. Application Data

(60) Provisional application No. 62/159,923, filed on May 11, 2015.

(51) Int. Cl.
*C01B 3/38* (2006.01)
*C07C 1/02* (2006.01)
(Continued)

(52) U.S. Cl.
CPC ............... *B01J 23/83* (2013.01); *C01B 3/40* (2013.01); *C01B 2203/0238* (2013.01);
(Continued)

(58) Field of Classification Search
CPC .... B01J 23/10; B01J 23/83; C01B 2203/1241
(Continued)

(56) References Cited

U.S. PATENT DOCUMENTS

| 4,378,331 A | * | 3/1983 | Bruning | ................ C01B 3/0031 420/455 |
| 4,808,564 A | * | 2/1989 | Matsumoto | .......... B01D 53/945 423/213.5 |

(Continued)

OTHER PUBLICATIONS

Kenarsari, Saeed Danaei, et al., Review of recent advances in carbon dioxide separation and capture, RSC Adv., 2013, 3, 22739-22773.
(Continued)

*Primary Examiner* — Cam N. Nguyen
(74) *Attorney, Agent, or Firm* — Aspire IP, LLC; Scott J. Hawranek

(57) ABSTRACT

The invention relates to $CeO_2$ and $La_2O_3$ for catalyzing $Fe_2O_3$—$Al_2O_3$ based chemical-looping reforming of $CH_4$ with $CO_2$ (CL-DRM). The reaction performance of all the composite oxygen carriers was evaluated in a fixed-bed reactor at atmospheric pressure condition. The influencing factors, including temperature and time-on-stream (TOS) were investigated. The characteristics of the oxygen carriers were checked with Brunauer-Emmett-Teller (BET) analysis and X-ray diffraction (XRD). The reducibility of the composite materials was elucidated with temperature-programmed reduction by $CH_4$ ($CH_4$-TPR). Preliminary experimental observations suggest that the simultaneous presence of $CeO_2$ and $La_2O_3$ can not only enhance the reactivity of $Fe_2O_3$—$Al_2O_3$ toward $CH_4$ oxidation and its oxygen releasing rate for fast reaction kinetics, but also improve the reactivity of its reduced form toward $CO_2$ splitting.

3 Claims, 12 Drawing Sheets

(51) Int. Cl.
   *B01J 23/10*    (2006.01)
   *B01J 23/70*    (2006.01)
   *B01J 23/74*    (2006.01)
   *B01J 23/83*    (2006.01)
   *C01B 3/40*     (2006.01)

(52) U.S. Cl.
   CPC .......... *C01B 2203/1047* (2013.01); *C01B 2203/1088* (2013.01); *C01B 2203/1241* (2013.01)

(58) Field of Classification Search
   USPC .............. 502/303, 304, 338, 525; 252/373
   See application file for complete search history.

(56) References Cited

U.S. PATENT DOCUMENTS

| | | | | |
|---|---|---|---|---|
| 5,306,441 A * | 4/1994 | Reddy | ............. | C09K 11/025 252/301.4 F |
| 5,447,705 A * | 9/1995 | Petit | ............. | B01J 23/002 423/263 |
| 5,559,073 A * | 9/1996 | Hu | ............. | B01D 53/945 423/213.2 |
| 5,591,315 A * | 1/1997 | Mazanec | ............. | B01D 53/326 204/295 |
| 5,977,017 A * | 11/1999 | Golden | ............. | B01D 53/945 502/302 |
| 6,352,955 B1 * | 3/2002 | Golden | ............. | B01D 53/945 423/263 |
| 6,531,425 B2 * | 3/2003 | Golden | ............. | B01D 53/945 502/302 |
| 6,800,388 B2 * | 10/2004 | Kaneko | ............. | B01J 23/002 429/479 |
| 7,375,054 B2 * | 5/2008 | Eguchi | ............. | B01J 23/002 423/210 |
| 7,381,394 B2 * | 6/2008 | Tanaka | ............. | B01D 53/945 423/263 |
| 7,504,085 B2 * | 3/2009 | Yang | ............. | B01D 53/945 423/21.1 |
| 7,514,055 B2 * | 4/2009 | Golden | ............. | B01D 53/944 423/213.2 |
| 2010/0227758 A1 * | 9/2010 | Yang | ............. | B01D 53/945 502/303 |

OTHER PUBLICATIONS

He, Yiming, et al., High-efficiency conversion of CO2 to fuel over ZnO/g-C3N4 photocatalyst, Applied Catalysis B: Environmental 168-169 (2015) 1-8.

Irani, Maryam, et al., Modified nanosepiolite as an inexpensive support of tetraethylenepentamine for CO2 sorption, Nano Energy (2015) 11, 235-246.

Najera, Michelle, et al., Carbon capture and utilization via chemical looping dry reforming, Chemical Engineering Research and Design 89 (2011) 1533-1543.

Hossain, Mohammad, et al., Chemical-looping combustion (CLC) for inherent CO2 separations—a review, Chemical Engineering Science 63 (2008) 4433-4451.

Adanez, Juan, et al., Progress in Chemical-Looping Combustion and Reforming technolgoies, Progress in Energy and Combustion Science 38 (2012) 215-282.

Xu, Long, et al.,Catalytic CO2 reforming of CH4 over Cr-promoted Ni/char for H2 production, International Journal of Hydrogen Energy 39 (2014) 10141-10153.

Cabello, A., et al., Kinetic determination of a highly reactive impregnated Fe2O3/Al2O3 oxygen carrier for use in gas-fueled Chemical Looping Combustion, Chemical Engineering Journal 258 (2014) 265-280.

Kierzkowska, A.M., et al., Development of Iron Oxide Carriers for Chemical Looping Combustion Using Sol-Gel, Ind. Eng. Chem. Res. 2010, 49, 5383-5391.

Bhavsar, Saurabh, et al., Chemical looping beyond combustion: production of synthesis gas via chemcial looping partial oxidation of methane, RSC Adv., 2014, 4, 47254-47267.

Zhu, Xing, et al., Chemical-Looping Steam Methane Reforming over a CeO2-Fe2O3 Oxygen Carrier: Evolution of Its Structure and Reducibility, ACS Publications, Energy Fuels 2014, 28, 754-760.

* cited by examiner

US 9,662,639 B2

CATALYTIC EFFECTS OF OXYGEN CARRIER BASED CHEMICAL-LOOPING REFORMING OF $CH_4$ WITH $CO_2$

CROSS REFERENCE TO RELATED APPLICATION

The present application claims the benefits of and priority, under 35 U.S.C. §119(e), to U.S. Provisional Application Ser. No. 62/159,923, filed May 11, 2015; the above-identified application being fully incorporated herein by reference.

BACKGROUND OF THE INVENTION

Field of the Invention

The invention generally relates to chemical-looping reforming, and more particularly to the catalytic effects with $CeO_2$ and/or $La_2O_3$ for catalyzing $Fe_2O_3$—$Al_2O_3$ based chemical-looping reforming of $CH_4$ with $CO_2$ (CL-DRM).

SUMMARY OF THE INVENTION

The present disclosure can provide a number of advantages depending on the particular aspect, embodiment, and/or configuration. These and other advantages will be apparent from the disclosure. Additional features and advantages may be learned by the practice of the invention.

Figure 1:
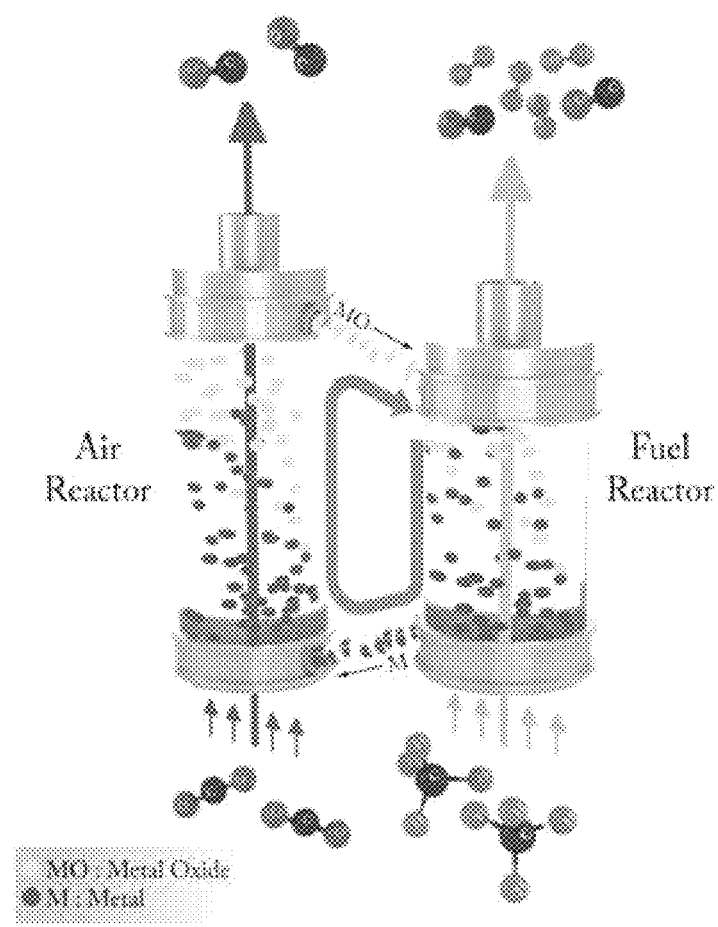
FIG. 1 illustrates an exemplary diagram of a schematic representation for a CL-DRM process.

In the appended figures, similar components and/or features may have the same reference label. Further, various components of the same type may be distinguished by following the reference label by a letter that distinguishes among the similar components. If only the first reference label is used in the specification, the description is applicable to any one of the similar components having the same first reference label irrespective of the second reference label.

DETAILED DESCRIPTION

The present disclosure can provide a number of advantages depending on the particular aspect, embodiment, and/or configuration. These and other advantages will be apparent from the disclosure.

The phrases "at least one," "one or more," and "and/or" are open-ended expressions that are both conjunctive and disjunctive in operation. For example, each of the expressions "at least one of A, B and C," "at least one of A, B, or C," "one or more of A, B, and C," "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising," "including," and "having" can be used interchangeably.

It shall be understood that the term "means," as used herein, shall be given its broadest possible interpretation in accordance with 35 U.S.C., Section 112(f). Accordingly, a claim incorporating the term "means" shall cover all structures, materials, or acts set forth herein, and all of the equivalents thereof. Further, the structures, materials or acts and the equivalents thereof shall include all those described in the summary of the invention, brief description of the drawings, detailed description, abstract, and claims themselves.

All publications and other references mentioned herein are hereby incorporated by reference as if fully set forth herein.

Carbon dioxide ($CO_2$) emitted via anthropogenic activities is widely recognized as the leading contributor to global warming. Kenarsari S D, et al., *Review of recent advances in carbon dioxide separation and capture*, RSC Adv 2013; 3:22739, doi:10.1039/c3ra43965h; He Y, et al., *High-efficiency conversion of CO2 to fuel over ZnO/g-C3N4 photocatalyst*, Appl Catal B Environ 2015; 168-169:1-8, doi: 10.1016/j.apcatb.2014.12.017; Irani M, et al., *Modified nanosepiolite as an inexpensive support of tetraethylenepentamine for $CO_2$ sorption*, Nano Energy 2014; the above-mentioned references are herein incorporated by reference in their entirety. The most common human activity that releases $CO_2$ is the combustion of fossil fuels (coal, petroleum and natural gas) for energy and transportation use, which constitutes about 80% of greenhouse gas (GHG) emissions in the U.S. on a $CO_2$ equivalent basis (U.S.E.P.A., 2010). However, approximately 83% of total energy consumption is anticipated to depend on fossil fuels at least for the next two decades (U.S.E.I.A., 2010). Najera M, et al., *Carbon capture and utilization via chemical looping dry reforming*, Chem Eng Res Des 2011; 89:1533-43, doi: 10.1016/j.cherd.2010.12.017, which is herein incorporated by reference in its entirety. In this regard, great global efforts are under way to develop efficient and affordable technologies for $CO_2$ capture and sequestration. Among current and emerging technologies for $CO_2$ capture, chemical-looping combustion (CLC) is a particular promising approach. Hossain M M. et al., *Chemical-looping combustion (CLC) for inherent separations—a review*, Chem Eng Sci 2008; 63:4433-51, doi:10.1016/j.ces.2008.05.028, which is herein incorporated by reference in its entirety. The first step of CLC involves, the reduction of metal oxide (also named as oxygen carrier, OC), in contact with a fuel in one reactor (fuel reactor, FR). The reduced OC is then transferred to the other reactor (e.g., air reactor (AR)) for replenishment of oxygen with an oxidizing agent which is typically air. Subsequently, the regenerated OC is conveyed back to FR, terminating the chemical loop. After the condensation of steam from the effluent of the FR, a high-pressure and high-purity stream of $CO_2$ can be obtained without further need of expensive gas separation unit. CLC thus offers a uniquely economical and efficient route for clean, $NO_x$-lean, flameless combustion of fossil or renewable fuels with the efficient production of sequestration-ready $CO_2$ streams.

Adanez J, et al., *Progress in chemical-looping combustion and reforming technologies*, Prog Energy Combust Sci 2012; 38:215-82, doi:10.1016/j.pecs.2011.09.001, which is herein incorproated by reference in its entirety.

Reference will now be made in detail to an embodiment of the present invention, an example of which is illustrated in the accompanying drawings.

FIG. 1 illustrates an exemplary diagram of a schematic representation for a CL-DRM process.

Since there is no proven technology for $CO_2$ sequestration with sufficient understanding of potential long-term impacts and effects, chemical-looping reforming of methane ($CH_4$) with $CO_2$ (CL-DRM) as shown in FIG. 1, has been proposed to extend the CLC principle, in which $CO_2$ is used as oxidant instead of air or steam, opening a pathway for $CO_2$ utilization. Najera, supra.

CL-DRM Process:

Fuel reactor: $MO+CH_4 \rightarrow M+2H_2+CO$      (R1)

Air reactor: $M+CO_2 \rightarrow MO+CO$      (R2)

Net reaction: $CH_4+CO_2 \rightarrow 2H_2+2CO$      (R3)

Traditional DRM reaction: $CH_4+CO_2 \rightarrow 2H_2+2CO$      (R4)

Utilizing $CH_4$ as the fuel, CL-DRM produces a net reaction similar to the traditional $CO_2$ reforming of $CH_4$ (DRM), where the stoichiometric half-reactions are based on a metallic "M" OC. The traditional DRM is a promising route for producing synthesis gas (syngas, $H_2$+CO) with a $H_2$/CO ratio close to unity, which is more favorable for subsequent methanol and Fischer-Tropsch synthesis. Although $CH_4$ conversion is not thermodynamically limited for DRM, high syngas yield and conversion of reactants are more favored at elevated temperature conditions. However, the strong endothermic nature of DRM would inevitably cause severe carbon deposition and high potential to particle sintering, both of which would lead to rapid catalyst deactivation. Xu L. et al., *Catalytic CO2 reforming of CH4 over Cr-promoted Ni/char for H2 production*, Int J Hydrogen Energy 2014; 39:10141-53, which is herein incorporated by reference in its entirety. In these regards, substantial research works have been devoted to develop more efficient catalysts with high resistance toward both coking and sintering problems.

Fe-based OCs are considered as a promising candidate for CLC applications, mainly for the low tendency to carbon formation and strong resistance to agglomeration, both of which are the two important factors help to maintain the activity of OC over continuous redox cycles. In addition, at any sulfur-containing environment with respect to gas concentration or operating temperature, Fe-based OCs can take absolutely no risks of the formation of both $S^{2-}$ and $SO_3^{2-}$ species. The large natural reserves and cost effectiveness of Fe-based OCs also make them suitable for CLC implementations. Nevertheless, Fe-based OCs have several drawbacks, which are the weak redox characteristics and relatively lower oxygen storage capacity (OSC), as well as their low reactivity toward gaseous fuel, especially for $CH_4$. Cabello A, et al., *Kinetic determination of a highly reactive impregnated $Fe_2O_3/Al_2O_3$ oxygen carrier for use in gas-fueled Chemical Looping Combustion*, Chem Eng J 2014; 258: 265-80, doi:10.1016/j.cej.2014.07.083, which is herein incorporated by reference in its entirety.

Supporting materials such as $Al_2O_3$ for $Fe_2O_3$ possesses better $CH_4$ conversion. However, the formation of $FeAl_2O_4$ during the preparation of OC would inevitably slow down the reduction rate of OC when Fe oxides are reduced beyond $Fe_3O_4$. Kierzkowska A M, et al., *Development of Iron Oxide Carriers for Chemical Looping Combustion Using Sol-Gel*, Ind Eng Chem Res 2010; 49:5383-91, doi:10.1021/ie100046f, which is herein incorporated by reference in its entirety. Among various approaches, introduction of promoter additives can, to some extent, relieve this problem.

Benefiting from high oxygen mobility in the bulk and capacity of hosting large concentrations of vacancies in the structure at elevated reaction temperatures, $La_2O_3$, as a representative rare earth metal oxide, has been widely researched. Another excellent rare earth metal oxide, $CeO_2$, has also been extensively researched. $CeO_2$ can strongly enhance the stability of the supported metal phase and increase its reactivity in redox processes. Although ceria itself does not show significant activity for $CH_4$ conversion nor does it significantly contribute to the overall oxygen storage capacity (OSC) of the carrier materials, this enhancement occurs.

In one embodiment, the simultaneous introduction of $CeO_2$ and $La_2O_3$ as catalyst materials could not only enhance its reactivity toward $CH_4$ oxidation, but also improve the reactivity of the reduced metal oxides toward $CO_2$ splitting. For the present contribution, we aim to synthesize the proposed oxygen carriers and screen them in a fixed-bed reactor for the evaluation of reaction behavior. The down-selected OC is then subjected to successive cyclic reduction and oxidation operation. The reaction mechanism and kinetic study will be established in the future work using more systematic experimental results. In one embodiment, the simultaneous introduction of $CeO_2$ and $La_2O_3$ as catalyst materials provide a dual component perovskite structure.

In one embodiment, it is proposed to utilize $CO_2$ instead of commonly used air as the oxygen supply for replenishment of oxygen-depleted metal oxides (also named as oxygen carrier, OC). The supply of $CO_2$ required by the air reactor (AR) can be divided into two portions. The major portion can be met by exhausted $CO_2$ stream from a coal gasification process. The secondary supply can be satisfied by water-gas shift process that converts CO into $CO_2$, in the process of which pure $H_2$ can be obtained as a refinement product. The water-gas shift process is generally established after the $CH_4$ oxidation in the fuel reactor (FR).

$CO+H_2O \rightarrow CO_2+H_2$      (R5)

The heat compensation required for both FR and AR can also be accomplished by introducing the high temperature exhausting $CO_2$ stream at high temperature from the upstream coal gasification process.

Simultaneously employ two rare earth oxides, $CeO_2$ and $La_2O_3$, as catalysts to enhance the reactivity of $Fe_2O_3$—$Al_2O_3$ toward $CH_4$ oxidation and its reduced form toward $CO_2$ splitting, and meanwhile increase the reaction kinetics.

Use ultra-sonication and freeze-drying assisted co-precipitation method to synthesize OCs, which would assist in achieving better dispersion of metal precursors over the supporting materials.

In one embodiment, the complete oxidation of methane simultaneously employing two rare earth oxides, $CeO_2$ and $La_2O_3$, as catalysts to enhance the reactivity of $Fe_2O_3$—$Al_2O_3$ toward $CH_4$ oxidation is according to equation (R6).

$$La_xCe_{1-x}FeO_3 + \frac{\delta_1}{4}CH_4 \rightarrow \frac{\delta_1}{4}CO_2 + \frac{\delta_1}{2}H_2O + La_xCe_{1-x}FeO_{3-\delta_1} \quad (R6)$$

The partial oxidation simultaneously employing two rare earth oxides, $CeO_2$ and $La_2O_3$, as catalysts to enhance the reactivity of $Fe_2O_3$—$Al_2O_3$ toward $CH_4$ oxidation is according to equation (R7).

$$La_xCe_{1-x}FeO_3 + \delta_2 CH_4 \rightarrow \delta_2 CO + 2\delta_2 H_2 + La_xCe_{1-x}FeO_{3-\delta_1} \quad (R7)$$

Oxygen Carrier (OC) regeneration or carbon capture using carbon while simultaneously employing two rare earth oxides, $CeO_2$ and $La_2O_3$, as catalysts is according to equation (R8).

$$La_xCe_{1-x}FeO_{3-\delta} + CO_2 \rightarrow La_xCe_{1-x}FeO_3 + CO \quad (R8)$$

The overall reaction with $Fe_2O_3$—$Al_2O_3$ as the oxygen include a complete oxidation reaction according to equation (R9).

$$12Fe_2O_3 + CH_4 \rightarrow 8Fe_3O_4 + CO_2 + 2H_2O \quad (R9)$$

The overall reaction with $Fe_2O_3$—$Al_2O_3$ as the oxygen include a partial oxidation reaction according to equation (R10).

$$Fe_3O_4 + CH_4 \rightarrow 3FeO + CO + 2H_2 \quad (R10)$$

Oxygen Carrier (OC) regeneration or carbon capture is according to equation (R11).

$$3FeO + CO_2 \rightarrow Fe_3O_4 + CO \quad (R11)$$

Oxygen Carrier (OC) regeneration or carbon capture with 30Fe30Ce40Al as the oxygen carrier is according to equation (R12), (R13) and (R14).

$$Ce_2O_3 + CO_2 \rightarrow 2CeO_2 + CO \quad (R12)$$

$$3CeO_2 + Fe_2O_3 + Fe \rightarrow CeFeO_3 \quad (R13)$$

$$CeO_2 + FeO \rightarrow CeFeO_3 \quad (R14)$$

Oxygen Carrier (OC) regeneration or carbon capture with 30Fe20Ce10La40Al as the oxygen carrier there is simultaneous presence of CeO2 and La2O3 is according to several reactions include equations R11 (in terms of Fe), R12 (in terms of Ce) and R17 (in terms of La).

In one embodiment, additional reactions during methane oxidation step is shown in (R16).

$$CH_4 + La^{3+}Fe^{3+}O_3^{2-} \xrightarrow{-O^{2-}} La^{3+}Fe_{0.5}^{2+}Fe_{0.5}^{3+}O_{3-t}^{2-}V_0 + CO + 2H_2 \quad (R16)$$

In equation (R16), t=the amount of removed oxygen from perovskite. The reaction represents only selective partial oxidation by the lattice, and not complete oxidation to $CO_2$ and $H_2O$ by the surface adsorbed oxygen. However, owing to the stable perovskite structure of $LaFeO_3$, the reduction kinetics present to be too slow.

In one embodiment, additional reactions during OC regeneration step are shown in equations (R17) and (R18).

$$CO_2 + La_2O_3 \rightarrow La_2O_2CO_3 \quad (R17)$$

$$La_2O_2CO_3 + C \rightarrow La_2O_3 + CO \quad (R18)$$

Figure 2:
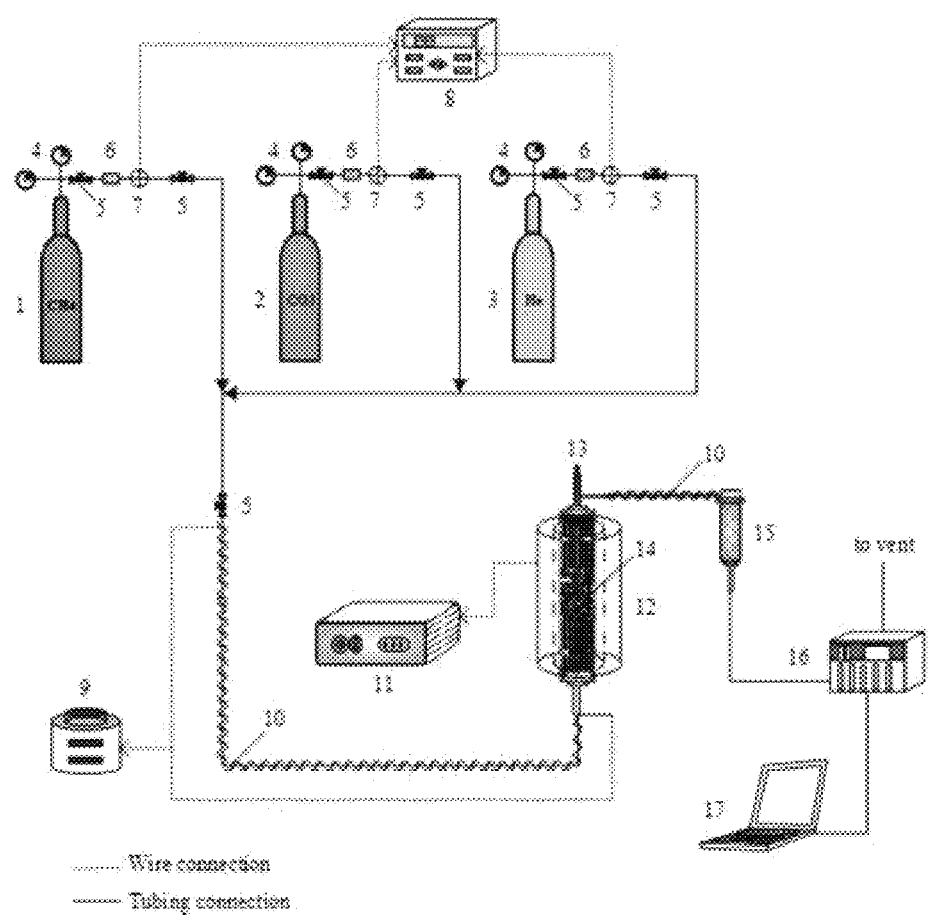
FIG. 2 illustrates an exemplary diagram of a setup configuration for CL-DRM process according to an example.

FIG. 2 illustrates an exemplary diagram of a setup configuration for CL-DRM process.

Referring to FIG. 2, the experimental setup configuration for CL-DRM process includes (1) $CH_4$ cylinder; (2) $CO_2$ cylinder; (3) He cylinder; (4) pressure regulators; (5) valves; (6) gas filter; (7) mass flow controller; (8) mass flow control box; (9) converter; (10) heating tape; (11) furnace controller; (12) furnace: (13) K-type thermocouple: (14) quartz reactor: (15) desiccator: (16) online mass spectrometer: and (17) computer.

Oxygen Carrier Preparation:

The following chemicals were used as the ingredients: $Fe(NO_3)_3 \cdot 9H_2O$ (Sigma-Aldrich, ≥98%), $Ce(NO_3)_3 \cdot 6H_2O$ (Sigma-Aldrich, 99.99%, trace metal basis), $La(NO_3)_3 \cdot 6H_2O$ (Fluka, ≥99.0%) and γ-$Al_2O_3$ (Alfa Aesar, 99.5%, metal basis). At the beginning of the synthesis process, a predetermined amount of metal nitrates (on the basis of 0~100 wt. % $Fe_2O_3$, 0~50 wt. % $CeO_2$ and 0+50 wt. % $La_2O_3$) and γ-$Al_2O_3$ support (0~100 wt. %) were dissolved in de-ionized $H_2O$ and well-dispersed in diluted ammonium hydroxide ($NH_4OH$) (EMD, 14.8 M), respectively. Subsequently, under ultrasonication (Qsonica, Q700), the nitrate solution was drop-wise injected into the excess $NH_4OH$-containing γ-$Al_2O_3$ solution mixture to form uniform precipitates. The resulting mixture was then subjected to a quick-frozen process in liquid nitrogen for 5 min and placed into a freeze-dryer (Labconco, FreeZone) for $H_2O$ removal, which approximately takes 72 h. The as-made material was simply crushed, followed by calcination in air at 900° C. for 6 h. The final metal oxides obtained were then finely crushed and sieved to a diameter size less than 180 μm. In comparison, $Fe_2O_3$—$Al_2O_3$ with the absence of promoters was also prepared following the same procedure as described above.

Oxygen Carrier Characterization:

The specific surface area of the composite OCs was measured through $N_2$ adsorption/desorption at −196° C. using a Brunauer-Emmett-Teller (BET) analyzer (Quantachrome, Autosorb-iQ). The samples were outgassed at 200° C. under vacuum for 2 h prior to the analysis. The X-ray diffraction (XRD) patterns of OCs before and after extended cyclic operation were obtained with an X-ray diffractometer system (Rigaku, Smartlab) using Cu Kβ radiation at 40 kV and 40 mA. The 2θ scanning range was chosen from 10° to 90° and the scanning rate was 1°/min.

Temperature-programmed reduction of $CH_4$ ($CH_4$-TPR) experiments were performed on a fixed-bed reactor under a gas mixture of $CH_4$/He (2 ml/min $CH_4$ diluted in 20 ml/min He). The temperature window between 50 and 1000° C. with a constant heating rate of 5° C./min was used for each run. Prior to each test, the sample was pre-treated by flowing 20 ml/min He at 500° C. for 1 h. The feed and product streams were monitored on-line using a mass spectrometer (Hiden, HPR-20 QIC) and He as the internal standard.

Oxygen Carrier Performance:

The successive cyclic CL-DRM experiments were carried out in the same fixed-bed quartz reactor as used for $CH_4$-TPR (4 mm in ID and 54 cm in length), which was vertically mounted inside a tube furnace (Carbolite, TVS). FIG. 2 shows the entire setup configuration. The reaction temperature was monitored at the center of the catalyst bed with a K-type thermocouple. During all the experiments, the temperature variance between the furnace and reactor was maintained at a reasonable range (3.5~4.5° C.). At the beginning of each cyclic test, a sample size of 0.1 g was placed in this quartz reactor and heated to 850° C. at 10° C./min under the flow of 20 ml/min He. The two redox half-steps of OC were simulated by periodically switching valves that alternatively enabled either $CH_4$ or $CO_2$ into the reaction system. In order to avoid the mixing of $CH_4$ and $CO_2$, a 30-min time gap for flushing the reaction system with He was used between different half-steps. It is also worthwhile to note that all the experiments were conducted at an atmospheric pressure condition.

On-stream conversions of $CH_4$ ($X_{CH_4}$) were evaluated using:

$$X_{CH_4} = \frac{n_{CH_4,in} - n_{CH_4,out}}{n_{CH_4,in}} \times 100\% \quad (E1)$$

Selectivity towards $CO_2$, CO and $H_2$ was calculated via the following equations:

$$S_{CO_2} = \frac{n_{CO_2,out}}{n_{CH_4,in} - n_{CH_4,out}} \times 100\% \quad (E2)$$

$$S_{CO} = \frac{n_{CO,out}}{n_{CH_4,in} - n_{CH_4,out}} \times 100\% \quad (E3)$$

$$S_{H_2} = \frac{0.5 \times n_{H_2,out}}{n_{CH_4,in} - n_{CH_4,out}} \times 100\% \quad (E4)$$

Where $n_{CH_4,in}$ is the molar fraction of $CH_4$ in the inlet feed stream:
while $n_{CH_4,out}$, $n_{H_2,out}$, $n_{CO,out}$ and $n_{CO,out}$ are the molar fractions of $CH_4$, $H_2$, CO and $CO_2$ in the effluents, respectively.

General Characteristics of Oxygen Carriers—Specific Surface Area:

TABLE 1

Specific surface area of the fresh samples

| Oxygen carrier | Specific surface area, m²/g |
|---|---|
| $Fe_2O_3$—$Al_2O_3$ | 13.4 |
| 30Fe30Ce40Al | 13.3 |
| 30Fe20Ce10La40Al | 56.2 |
| 30Fe10Ce20La40Al | 55.9 |
| 30Fe30La40Al | 49.7 |

The specific surface area (SSA) of the composite OCs is summarized in Table 1. It is noted that the SSA of $Fe_2O_3$—$Al_2O_3$ has negligible change when 30 wt. % $CeO_2$ is introduced. As $La_2O_3$ is added as the secondary catalyst, the SSA of $Fe_2O_3$—$Al_2O_3$ has a remarkable increase by 319.97%. Further increasing weight loading of $La_2O_3$, along with correspondingly decreasing $CeO_2$ content, could result in slight loss in the SSA of $Fe_2O_3$—$Al_2O_3$.

Figure 3:
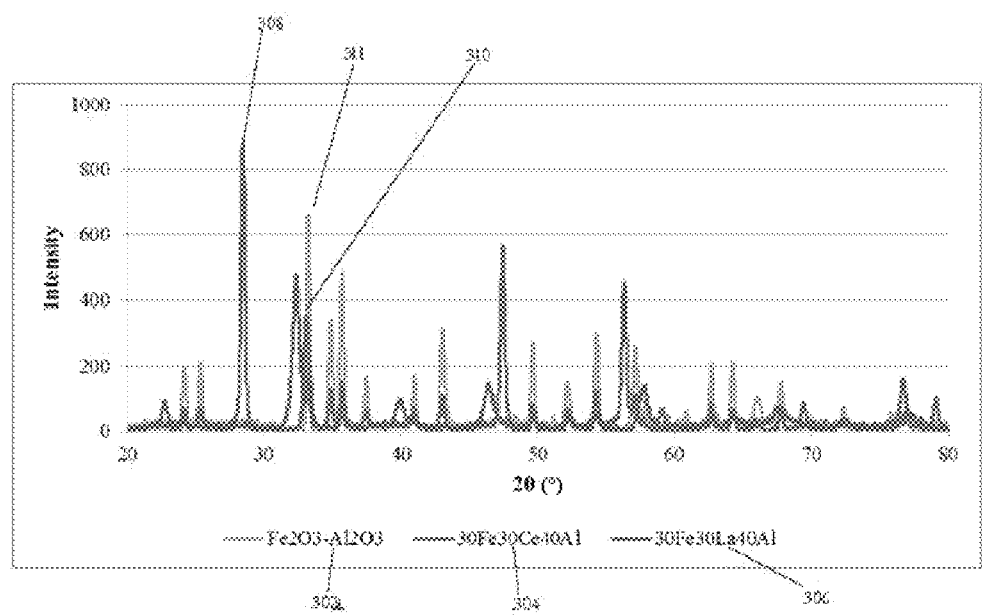
FIG. 3 illustrates a chart of powder diffraction patterns for the composite oxygen carriers before and after isothermal $CH_4$ oxidation.

FIG. 3 illustrates a chart of powder diffraction patterns for the composite oxygen carriers before and after isothermal $CH_4$ oxidation.

X-ray diffraction: The bulk phases of fresh $Fe_2O_3$—$Al_2O_3$ (302), 30Fe30Ce40Al (304) and 30Fe30La40Al (306) OCs were determined by X-ray diffraction (XRD) as illustrated in FIG. 3, which plots Intensity on the y-axis and x-axis represents the diffraction angle, $2\theta$ [degrees]. The signature peak at 33.12° (311) (JCPDS card No.: 01-072-0469) on all the samples is attributed to hematite $Fe_2O_3$. In the case of 30Fe30Ce40Al (304), a prominent peak (308) appears at 28.68° which can be ascribed to $CeO_2$ (JCPDS card No.: 00-001-0800). Another new peak (310) at 33.10° is also observed which could be due to the formation of $CeAlO_3$ (33.54°, JCPDS card No.: 01-076-3781) and/or $CeFeO_3$ (32.29°, JCPDS card No.: 00-022-0166) during the calcination step. For 30Fe30La40Al (306), there is no obvious peak for $La_2O_3$ (30.06°, JCPDS card No.: 00-002-0688), while showing prominent existence for perovskite Fe—La phase $LaFeO_3$ (32.53°, JCPDS card No.: 01-075-0439).

Figure 4A:
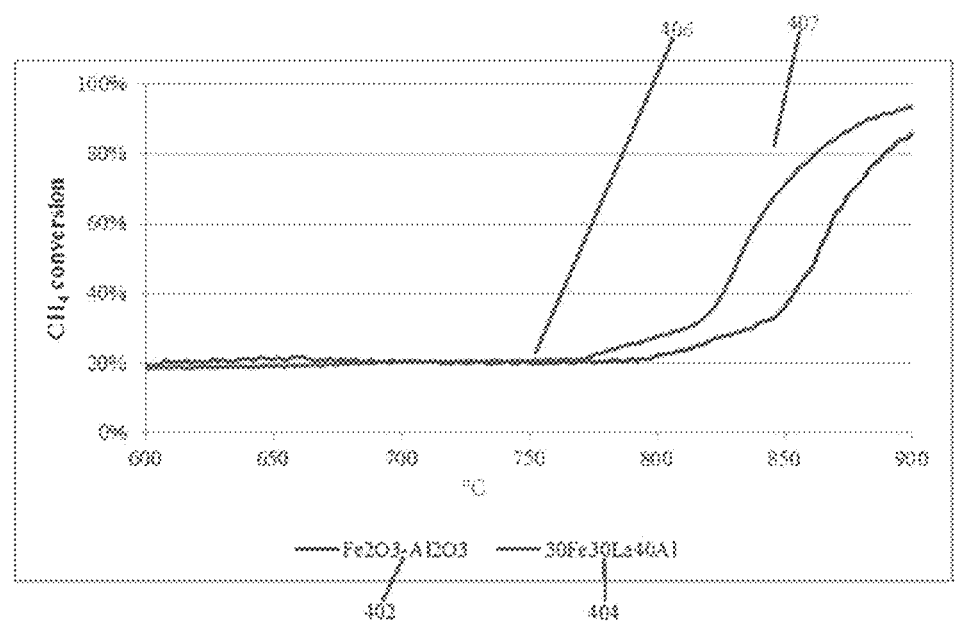
FIGS. 4A-4C illustrate charts of $CH_4$-TPR profiles of the composite oxygen carriers with respect to $CH_4$ conversion, and selectivity toward $H_2$ and CO.
Figure 4B:
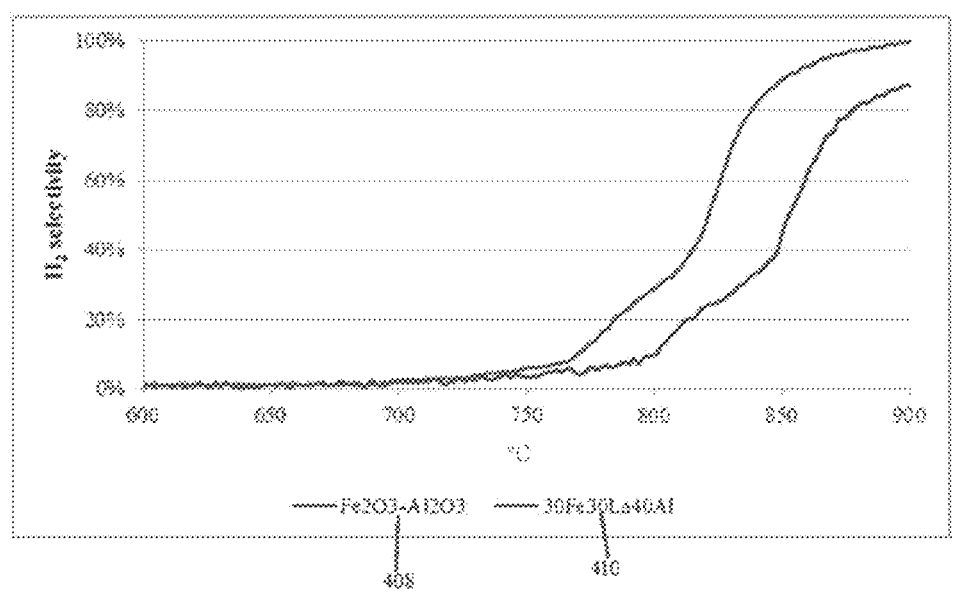
Figure 4C:
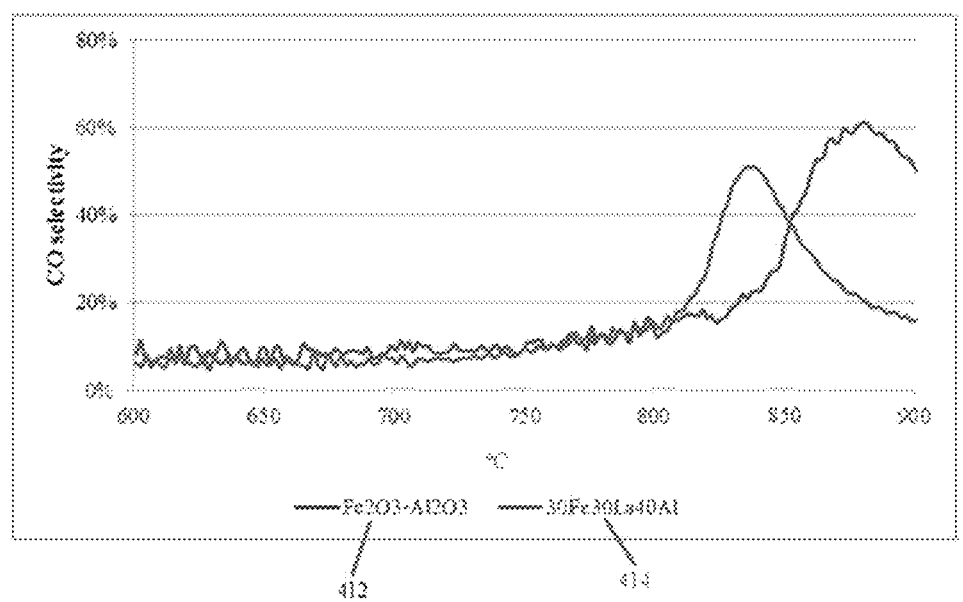

FIGS. 4A-4C illustrate charts of $CH_4$-TPR profiles of the composite oxygen carriers with respect to $CH_4$ conversion, and selectivity toward $H_2$ and CO (200-900° C., 2 ml/min $CH_4$, 20 ml/min He, GHSV=13200 cm/$g_{cat}$·h).

Reaction Performance of Oxygen Carriers:

The $CH_4$-TPR patterns of $Fe_2O_3$—$Al_2O_3$ (402) and 30Fe30La40Al (404) are presented in FIG. 4A. The graph includes on the y-axis $CH_4$ conversion, and on the x-axis temperature [° C.] of the composite oxygen carriers with respect to $CH_4$ conversion. The partial oxidation of $CH_4$ starts from approximately 750° C., (406) accompanied with the evolution of $H_2$ and CO. In comparison, the introduction of $La_2O_3$ to $Fe_2O_3$—$Al_2O_3$ can significantly increase the conversion of $CH_4$ within the temperature window between 775 and 900° C. as shown (407) in FIG. 4A. Moreover, although the total amount of generated CO over 30Fe30La40Al (404) seems to be slightly smaller than that over $Fe_2O_3$—$Al_2O_3$ (402), the presence of $La_2O_3$ can shift the CO production to a lower temperature. The methane conversion follows equations R6, R7, R9, R10, and R16 as described herein.

FIG. 4B illustrates reaction selectivity for $H_2$ for $Fe_2O_3$—$Al_2O_3$ (408) and 30Fe30LA40Al (410) demonstrating shift in selectivity for $H_2$ between about 750° C. and 900° C.

FIG. 4C illustrates reaction selectivity for reduction to CO for $Fe_2O_3$—$Al_2O_3$ (412) and 30Fe30La40Al (414) demonstrating shift in selectivity for $CO_2$ reduction to CO between about 800° C. to 900° C.

FIGS. 5A-5D illustrate charts of the effect of TOS on $CH_4$ conversion, and selectivity toward $H_2$, CO and $CO_2$ over the composite oxygen carriers (850° C., 2 ml/min $CH_4$, 20 ml/min He, GHSV=13200 cm³/$g_{cat}$·h, 60 min TOS).

Isothermal Oxidation of $CH_4$:

Isothermal oxidation of $CH_4$ was performed to explore the reactivity of the fresh samples toward $CH_4$ conversion in 60 min. The profiles of composite OCs with respect to $CH_4$ conversion, selectivity toward $H_2$, CO and $CO_2$ are presented in FIGS. 5A-5D. Typically for Fe-based OC, depending on the ratio of the available oxygen to carbon, the total oxidation, partial oxidation and pyrolysis of $CH_4$ can occur in sequence as the OC is progressively reduced. Bhavsar S, et al., *Chemical looping beyond combustion: production of synthesis gas via chemical looping partial oxidation of methane*, RSC Adv 2014, which is herein incorporated by reference in its entirety. Meanwhile, it would gradually become fuel-rich on the surface of OC. During the isothermal reaction between $CH_4$ and the solid OC, active oxygen (surface-adsorbed oxygen and surface lattice oxygen) was first converted into deep-oxidation products (i.e., $CO_2$ and $H_2O$) and then less active oxygen (bulk lattice oxygen) was converted into partial oxidation products (i.e., $H_2$ and CO). Zhu X, et al., *Chemical-Looping Steam Methane Reforming over a $CeO_2$—$Fe_2O_3$ Oxygen Carrier: Evolution of Its Structure and Reducibility*, Energy & Fuels 2014, which is herein incorporated by reference in its entirety. Samples with different distributions of oxygen species provide compelling evidence that samples with lower concentrations of surface oxygen produces smaller amounts of $CO_2$ at the beginning of the isothermal reaction, whereas samples with greater concentrations of surface oxygen produces larger amounts of $CO_2$. The methane conversion follows equations R6, R7, R9, R10, and R16 as described herein.

Figure 5A:
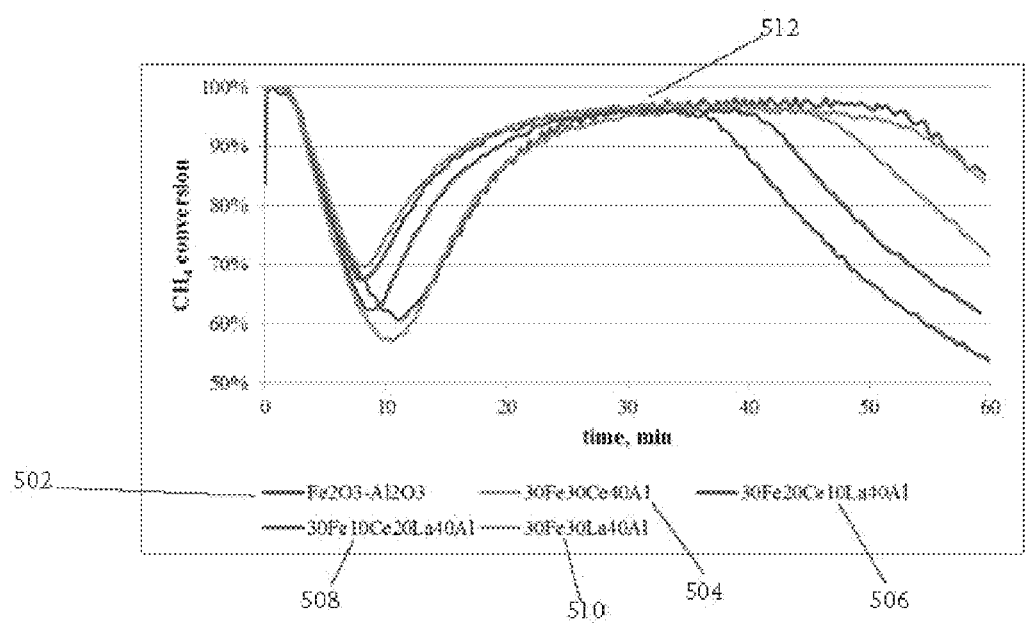
FIGS. 5A-5D illustrate charts of the effect of TOS on $CH_4$ conversion, and selectivity toward $H_2$, CO and $CO_2$ over the composite oxygen carriers.

In FIG. 5A, $CH_4$-TPR patterns of $Fe_2O_3$—$Al_2O_3$ (502), 30Fe30Ce40Al (504), 30Fe20Ce10La40Al (506), 30Fe10Ce20La40Al (508), and 30Fe30La40Al (510) are presented. $CH_4$ conversion with stoichiometric methane feed for full oxidation $Fe_2O_3$—Al2O3, with oxidized carrier showing temperature dependent selectivity of partial oxidation over full oxidation. Then, $CH_4$ conversion increases until a plateau 512 is reached, the process of which can be ascribed to the conversion of less active oxygen (bulk lattice oxygen) into partial oxidation products (i.e., $H_2$ and CO). Subsequently, a decline in $CH_4$ conversion is observable due to a lack of available oxygen. In general, samples with different distributions of oxygen species provide compelling evidence that samples with lower concentrations of surface oxygen produce smaller amounts of $CO_2$ at the beginning of the isothermal reaction, whereas samples with greater concentrations of surface oxygen produce larger amounts of $CO_2$.

Figure 5B:
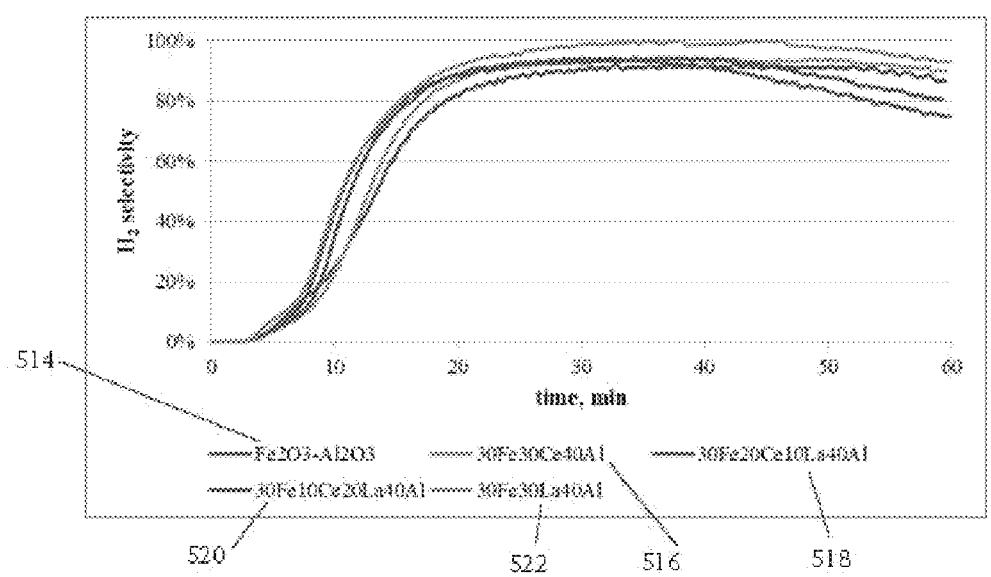
Figure 5C:
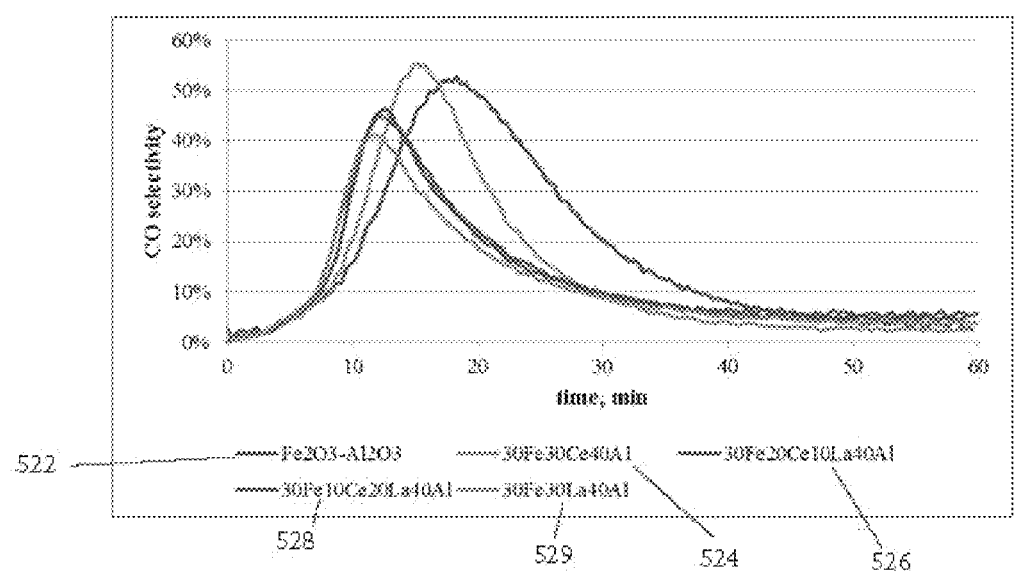
Figure 5D:
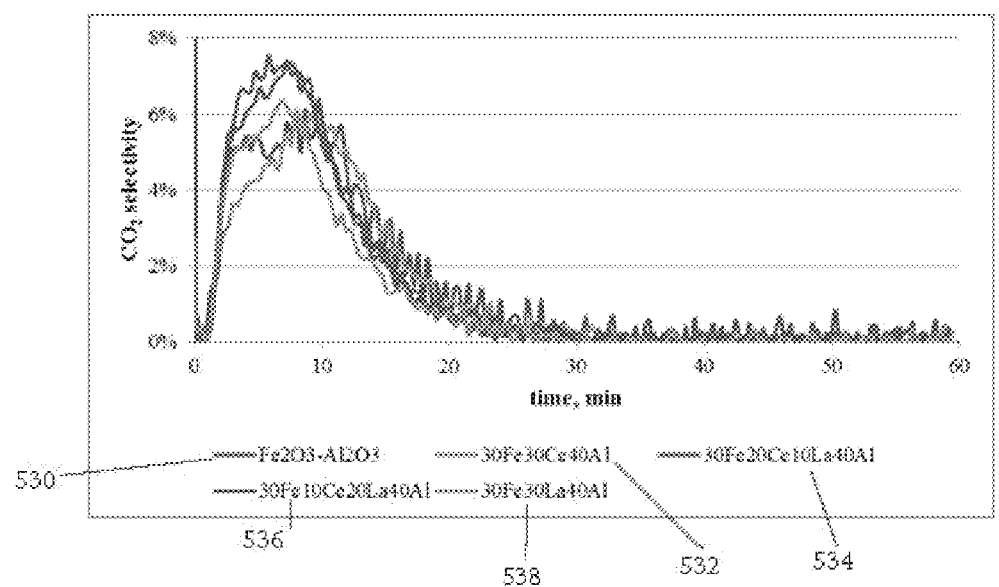

FIG. 5B illustrates reaction selectivity for $H_2$ for $Fe_2O_3$—$Al_2O_3$ (514), 30Fe30Ce40Al (516), 30Fe30La40Al (518), 30Fe10Ce20La40Al (520), and 30Fe30La40Al (522) demonstrating shift in selectivity for $H_2$ between about 10 mins and 20 mins. FIG. 5C illustrates reaction selectivity for reduction to CO for Fe2O3-Al2O3 (522), 30Fe30Ce40Al (524), 30Fe20Ce10La40Al (526), 30Fe10Ce20La40Al (528), and 30Fe30La40Al (529) demonstrating shift in selectivity for $CO_2$ reduction to CO between about 10 mins to 20 mins. FIG. 5D illustrates reaction selectivity for $CO_2$ selectivity for $Fe_2O_3$—$Al_2O_3$ (530), 30Fe30Ce40Al (532), 30Fe20Ce10La40Al (534), 30Fe10Ce20La40Al (536), and 30Fe30La40Al (538) demonstrating a shift in selectivity between about 5 mins to 20 mins.

Referring to FIGS. 5B-5D, samples with improved oxygen mobility can steer the reaction toward partial oxidation of $CH_4$ in advance, giving rise to excess $H_2$ generation (FIG. 5B) originating from $CH_4$ pyrolysis. Therefore, with higher $CeO_2$ content, the OCs tend to possess more enduring reactivity toward complete oxidation of $CH_4$ and higher CO selectivity as indicated in FIG. 5C, which could be attributed to the improved OSC and basicity for gasification of deposited carbon. Unlike $CeO_2$, although the introduction of $La_2O_3$ shows lower CO evolution, the oxygen releasing rate of $La_2O_3$ catalyzed OCs is much faster than the $CeO_2$ catalyzed ones. That is to say, samples with higher $La_2O_3$ content prone to produce more $H_2$ and in turn induce heavier carbon deposition. Another drawback of $La_2O_3$ loaded OCs lies in the presence of $LaFeO_3$, which possesses a perovskite-type structure. $LaFeO_3$ is so stable that its slow reduction kinetics remains to be a challenge, which is also the cause for severe carbon deposition. Moreover, there is no significant difference in $CO_2$ selectivity (FIG. 5D) among these samples, mainly due to the lack of surface active oxygen species. Hence, it is intriguing to target on the simultaneous introduction of both rare earth metal additives and see whether to some extent it can make a mutual complementarity. Indeed, both 30Fe20Ce10La40Al and 30Fe10Ce20La40Al share commons in higher oxygen releasing rate (only less than 30Fe30La40Al), improved OC reduction kinetics and best resistance toward carbon deposition within the experimental time frame.

Figure 6:
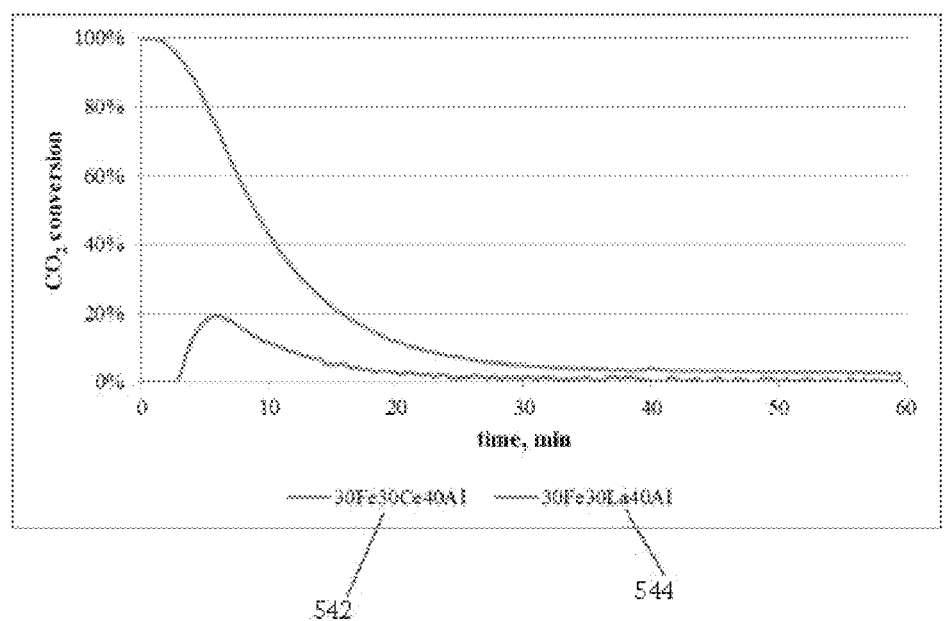
FIG. 6 illustrates a chart of the effect of TOS on $CO_2$ conversion over the composite oxygen carriers.

FIG. 6 illustrates a chart of the effect of TOS on $CO_2$ conversion over the composite oxygen carriers 30Fe30Ce40Al (542) and 30Fe30La40Al (544) (850° C., 2 ml/min $CO_2$, 20 ml/min He, GHSV=13200 cm3/gcat·h, 60 min TOS).

Referring to FIG. 6, it is shown that with higher $CeO_2$ content, the OCs tend to possess more enduring reactivity toward $CH_4$ conversion and higher CO selectivity, which could be attributed to the improved OSC and basicity for gasification of deposited carbon. Unlike $CeO_2$, although the introduction of $La_2O_3$ shows lower CO evolution, the oxygen releasing rate of $La_2O_3$ catalyzed OCs is much faster than the $CeO_2$ catalyzed ones. Moreover, due to the high oxygen mobility of $La_2O_3$, the available oxygen can be rapidly replenished by the lattice oxygen from the bulk phase, steering the reaction toward partial oxidation of $CH_4$ in advance.

Isothermal $CO_2$ splitting: Isothermal $CO_2$ splitting was performed after pre-reducing the fresh OCs with $H_2$ at 500° C. for 1 h, therefore the reactivity of OCs in their reduced form toward $CO_2$ can be evaluated in the absence of the influence of carbon deposition from $CH_4$ pyrolysis. The profiles of 30Fe30Ce40Al (542) and 30Fe30La40Al (544) are presented in FIG. 6. As it indicates, $CeO_2$ catalyzed $Fe_2O_3$—$Al_2O_3$ possesses higher $CO_2$ conversion than the $La_2O_3$ catalyzed one.

Figure 7:
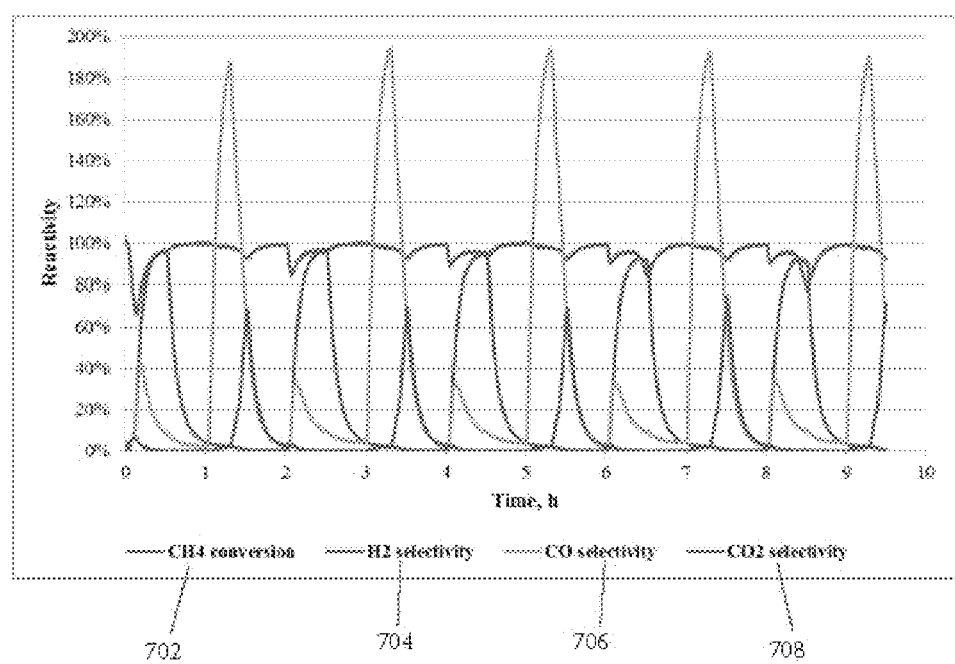
FIG. 7 illustrates a chart of gaseous products during successive redox process of CL-DRM over an oxygen carrier.

FIG. 7 illustrates a chart of gaseous products during successive redox process ($CH_4$ oxidation/$CO_2$ splitting) of CL-DRM over 30Fe30La40Al (850° C., alternating 2 ml/min $CH_4$ and 2 ml/min $CO_2$ every 30 min, 20 ml/min He as carrier gas, GHSV=13200 cm$^3$/gcat·h).

Successive Cyclic Reduction and Oxidation:

FIG. 7 shows five representative cycles for the cyclic reduction and oxidation of 30Fe30Ce40Al at 850° C. by periodically alternating $CH_4$ and $CO_2$. It shows $CH_4$ conversion 702, $H_2$ selectivity 704, CO selectivity 706, and $CO_2$ selectivity 708 and one can see that this OC shows stable operation as apparent from the absence of any significant changes in height or shape of the concentration traces with time, thus confirming the stability of the OC over the timeframe of the experiments. The CO starting time was shifted to an earlier time with an increasing cycle number. Notably, the area of the CO peak also increased with an increasing cycle number. These phenomena confirm that the selectivity for $CH_4$ conversion was greatly improved by redox process treatments over the Ce—Fe mixed oxide. In addition, favorable oxygen mobility was achieved in the recycled samples because the recycled samples exhibited high CO evolution rates and evolved large amounts of CO during this gas-solid reaction. Id.

The preceding is a simplified summary of the disclosure to provide an understanding of some aspects of the disclosure. This summary is neither an extensive nor exhaustive overview of the disclosure and its various aspects, embodiments, and/or configurations. It is intended neither to identify key or critical elements of the disclosure nor to delineate the scope of the disclosure but to present selected concepts of the disclosure in a simplified form as an introduction to the more detailed description presented below. As will be appreciated, other aspects, embodiments, and/or configurations of the disclosure are possible, utilizing, alone or in combination, one or more of the features set forth above or described in detail below.

Embodiments herein presented are not exhaustive, and further embodiments may be now known or later derived by one skilled in the art.

To avoid unnecessarily obscuring the present disclosure, the preceding description may omit a number of known procedures and/or compositions. This omission is not to be construed as a limitation of the scopes of the claims. Specific details are set forth to provide an understanding of the present disclosure. It should however be appreciated that the present disclosure may be practiced in a variety of ways beyond the specific detail set forth herein.

Also, a number of variations and modifications of the disclosure can be used. It would be possible to provide for some features of the disclosure without providing others.

The foregoing discussion has been presented for purposes of illustration and description. The foregoing is not intended to limit the disclosure to the form or forms disclosed herein. In the foregoing description for example, various features of the disclosure are grouped together in one or more aspects, embodiments, and/or configurations for the purpose of streamlining the disclosure. The features of the aspects, embodiments, and/or configurations of the disclosure may be combined in alternate aspects, embodiments, and/or configurations other than those discussed above. This method of disclosure is not to be interpreted as reflecting an intention that the claims require more features than are expressly recited in each claim. Rather, as the following claims reflect, inventive aspects lie in less than all features of a single foregoing disclosed aspect, embodiment, and/or configuration. Thus, the following claims are hereby incorporated into this description, with each claim standing on its own as a separate preferred embodiment of the disclosure.

Moreover, though the description has included a description of one or more aspects, embodiments, and/or configurations and certain variations and modifications, other variations, combinations, and modifications are within the scope of the disclosure, e.g., as may be within the skill and knowledge of those in the art, after understanding the present disclosure. It is intended to obtain rights which include alternative aspects, embodiments, and/or configurations to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed:

1. A dual component catalytic composition for oxidation or partial oxidation of methane, comprising:
a perovskite crystallographic structure comprising a formula:

$$La_xCe_{1-x}FeO_3$$

wherein said x is a range from 0 to 1.

2. A dual component catalytic composition for carbon dioxide capture, comprising:
a perovskite crystallographic structure comprising a formula:

$$La_xCe_{1-x}FeO_{3-\delta}$$

wherein said x is a range from 0 to 1, and
wherein said $\delta$ is a value indicative of oxygen consumed by oxidation.

3. A method of enhancing a reactivity of $Fe_2O_3$—$Al_2O3$ toward $CH_4$ oxidation and enhancing an oxygen releasing rate for improving kinetics, comprising the steps of:
introducing a gaseous feed mixture comprising carbon dioxide into a reactor containing a dual component perovskite crystallographic structure $La_xCe_{1-x}FeO_3$, wherein said x is a range from 0 to 1; and
performing oxidation or partial oxidation according to reactions R1 and R2:

$$La_xCe_{1-x}FeO_3 + \frac{\delta_1}{4}CH_4 \rightarrow \frac{\delta_1}{4}CO_2 + \frac{\delta_1}{2}H_2O + La_xCe_{1-x}FeO_{3-\delta_1} \quad (R1)$$

$$La_xCe_{1-x}FeO_3 + \delta_2 CH_4 \rightarrow \delta_2 CO + 2\delta_2 H_2 + La_xCe_{1-x}FeO_{3-\delta_2}, \quad (R2)$$

wherein said x is a range from 0 to 1, and
wherein said $\delta$ is a value indicative oxygen consumed by oxidation.

* * * * *